(12) United States Patent
Jo

(10) Patent No.: US 8,160,608 B2
(45) Date of Patent: Apr. 17, 2012

(54) POSITION DETECTION

(75) Inventor: Young-Hoon Jo, Seongnam (KR)

(73) Assignee: Core Logic, Inc., Seoul (KR)

(*) Notice: Subject to any disclaimer, the term of this patent is extended or adjusted under 35 U.S.C. 154(b) by 1101 days.

(21) Appl. No.: 12/069,794

(22) Filed: Feb. 12, 2008

(65) Prior Publication Data

US 2009/0117916 A1   May 7, 2009

(30) Foreign Application Priority Data

Feb. 13, 2007 (KR) .................. 10-2007-0015006

(51) Int. Cl.
*H04W 24/00* (2009.01)
(52) U.S. Cl. .............. 455/456.1; 455/69; 455/404.2; 455/502; 455/504; 455/67.16
(58) Field of Classification Search .......... 455/69, 455/404.2, 456.1, 502, 504, 67.16
See application file for complete search history.

(56) References Cited

U.S. PATENT DOCUMENTS

| 6,697,629 | B1 | 2/2004 | Grilli et al. | |
|---|---|---|---|---|
| 2006/0214840 | A1* | 9/2006 | Kim et al. | 342/118 |
| 2006/0258298 | A1* | 11/2006 | Kim et al. | 455/69 |
| 2008/0101504 | A1* | 5/2008 | Huang et al. | 375/340 |

FOREIGN PATENT DOCUMENTS

KR   10-2003-0036913 A   5/2003

* cited by examiner

*Primary Examiner* — Kwasi Karikari
(74) *Attorney, Agent, or Firm* — Edwards Wildman Palmer LLP

(57) ABSTRACT

Techniques and apparatus are described for detecting a position of a target. A position detection device associated with a wireless communication system includes an accumulator to sample and accumulate a pulse signal included in an input signal. A double-sliding window is connected to the accumulator to detect a starting point of the input signal. Also, a synchronization controller is connected to the accumulator to generate a synchronization signal to enable the accumulator to sample and accumulate the pulse signal. In addition, a time shift calculator is connected to the accumulator to correct the detected starting point of the input signal based on the accumulated pulse signal. Further, a position calculator is connected to the time shift calculator to calculate a position of a target based on the corrected starting point.

18 Claims, 7 Drawing Sheets

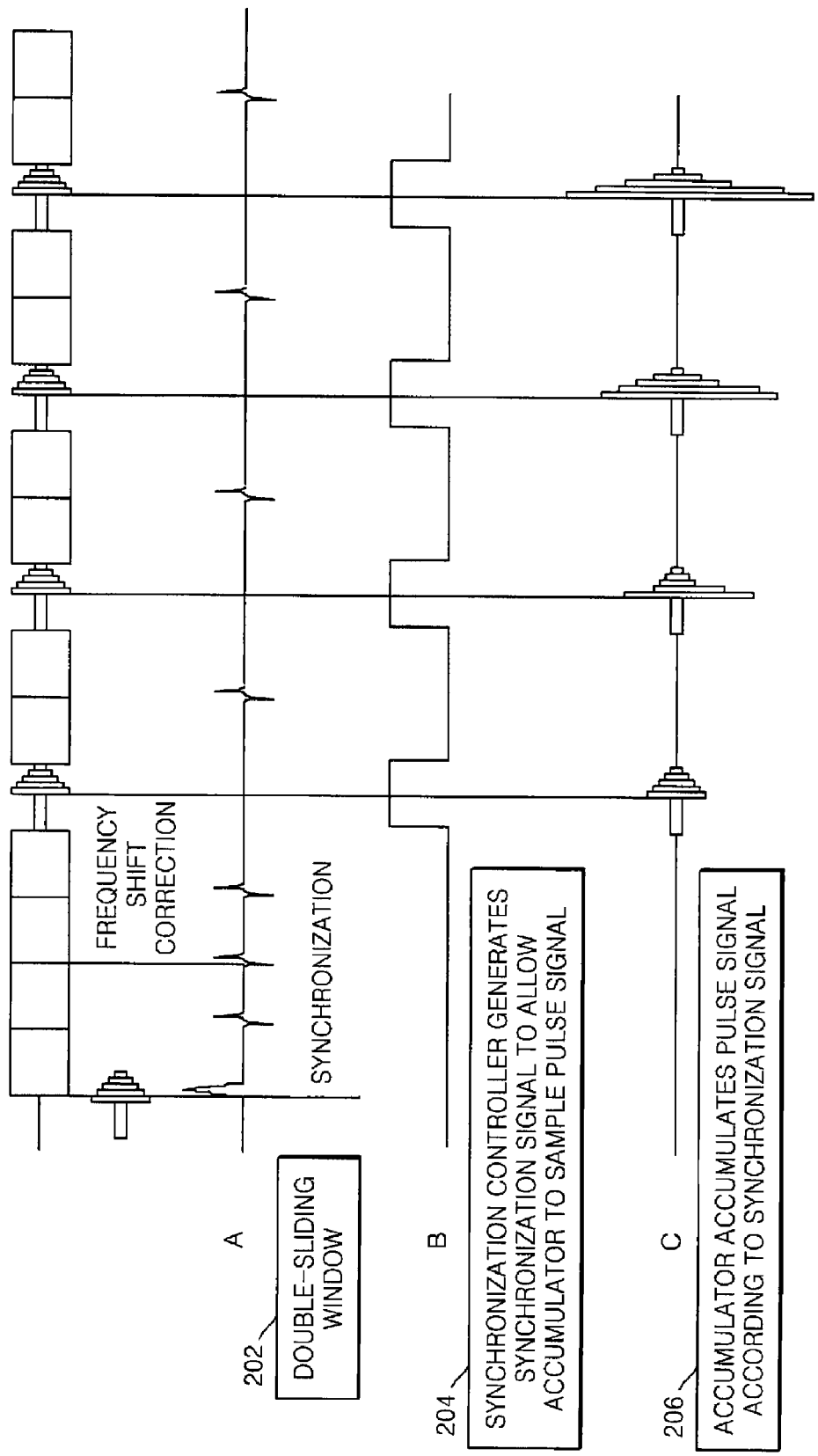

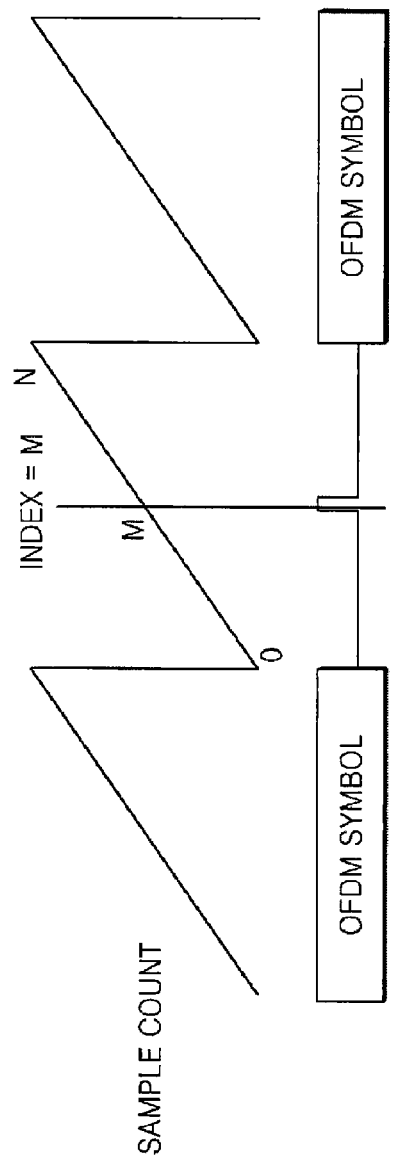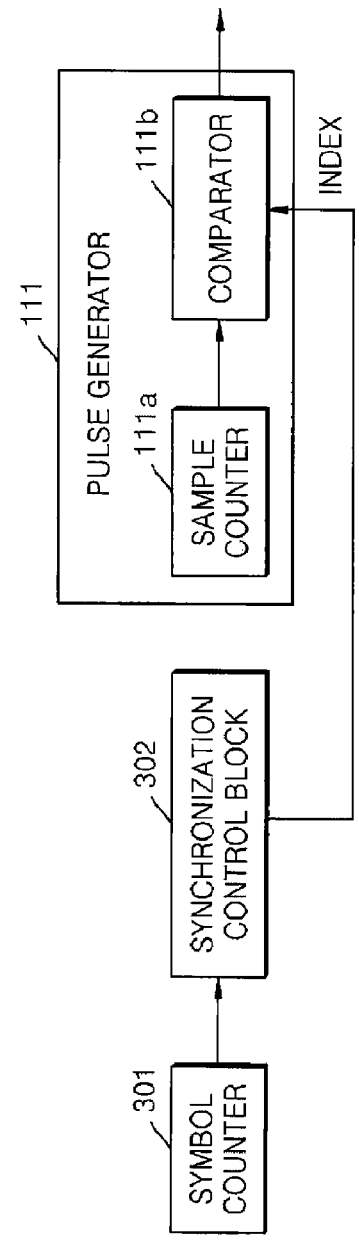
FIG. 3A
FIG. 3B

FIG. 6
610 — i) WHEN PAIR OF OFDM SYMBOL AND PULSE ARE TRANSMITTED ONE BY ONE
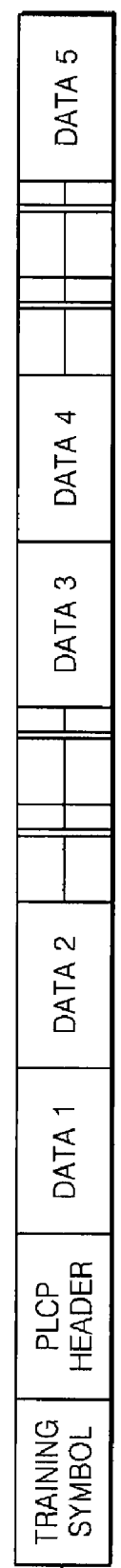
620 — ii) WHEN PAIR OF OFDM SYMBOL AND PULSE ARE TRANSMITTED TWO BY TWO
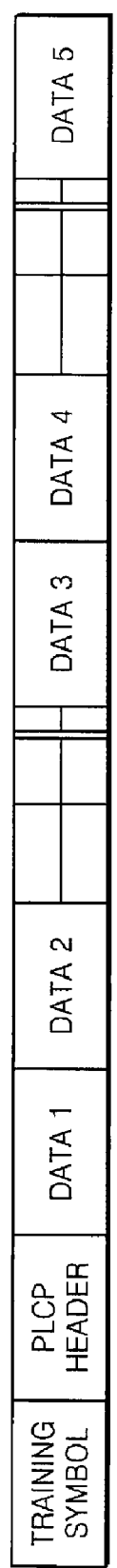
630 — iii) WHEN TWO OFDM SYMBOLS, IDLE PERIOD AND SINGLE PULSE ARE SEQUENTILLY TRANSMITTED

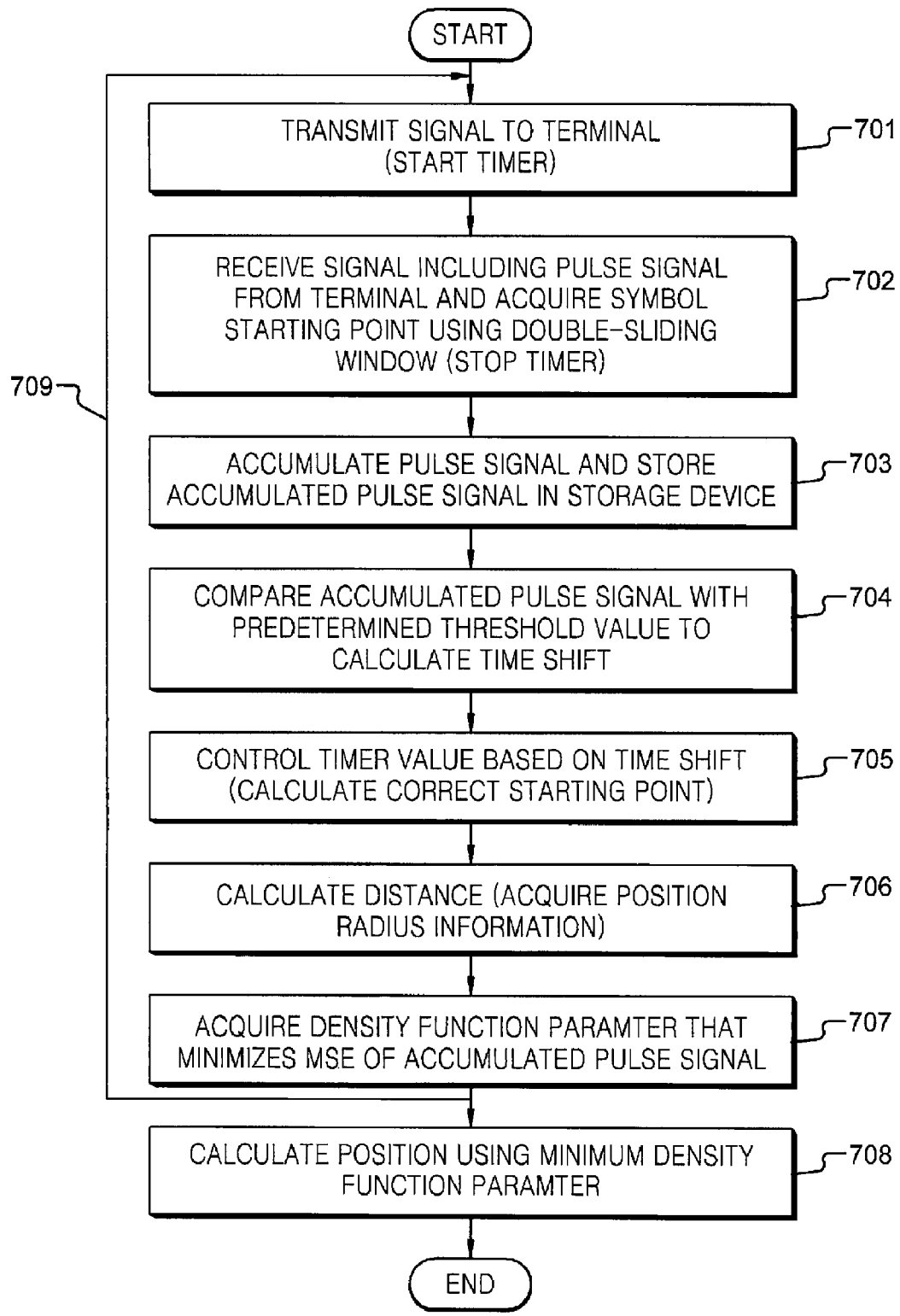

POSITION DETECTION

CLAIM OF PRIORITY

This application claims priority under 35 USC §119(a) to Korean Patent Application No. 10-2007-0015006, filed on 13 Feb. 2007, in the Korean Intellectual Property Office, the entire contents of which are hereby incorporated by reference.

TECHNICAL FIELD

The present disclosure relates to a position detection device.

BACKGROUND

Providing position detection services in indoor environments, such as home networks and personal area networks can be challenging. To provide position detection services in such indoor environments, at least one base station must be installed. However, installing a base station to enable position detection services in a confined area, such as the indoor area can be cost prohibitive.

SUMMARY

Techniques and apparatus are described for efficient detection of a position of a target and to improve the accuracy of position detection.

In one aspect, a position detection device associated with a wireless communication system includes an accumulator to sample and accumulate a pulse signal included in an input signal. A double-sliding window is connected to the accumulator to detect a starting point of the input signal. Also, a synchronization controller is connected to the accumulator to generate a synchronization signal to enable the accumulator to sample and accumulate the pulse signal. In addition, a time shift calculator is connected to the accumulator to correct the detected starting point of the input signal based on the accumulated pulse signal. Further, a position calculator is connected to the time shift calculator to calculate a position of a target based on the corrected starting point.

Implementations can optionally include one or more of the following features. The time shift calculator can be designed to correct the starting point detected by the double-sliding window by performing various operations. For example, a magnitude of the accumulated pulse signal can be compared with a threshold value, and a point in time can be detected when the magnitude exceeds the threshold value. Also, the wireless communication system associated with the position detection device can include an ultra-wide band (UWB) wireless local area network. The position detection device can also include a transmitter to transmit the input signal that includes the pulse signal. The transmitter can include a pulse generator to generate the pulse signal and an orthogonal frequency division multiplexing (OFDM) symbol generator to generate an OFDM symbol. Also, the transmitter can include a multiplexer connected to the pulse generator and the OFDM symbol generator to output the generated pulse signal and the generated OFDM symbol in a predetermined order. The multiplexer can be designed to alternately output the generated pulse signal and the generated OFDM symbol.

Also, implementations can optionally include one or more of the following features. The position calculator can include a distance calculator connected to the time shift calculator to calculate a distance between the target and the position detection device based on the starting point corrected by the time shift calculator. The position calculator can also include a density function parameter unit connected to the accumulator to detect a density function parameter that minimizes a mean square error (MSE) of the accumulated pulse signal stored in the accumulator. Further, the position calculator can be designed to select a pulse signal having a minimum density function parameter or a pulse signal having distance information corresponding to a shortest distance to calculate the position of the target based on the selected pulse signal. The position calculator can be designed to obtain a position radius information based on a pulse signal having distance information corresponding to the shortest distance and calculate the position of the target based on a pulse signal having a minimum density function parameter.

In another aspect, a mobile communication terminal associated with a wireless communication system includes an accumulator to sample and accumulate a pulse signal included in a symbol. The mobile communication terminal also includes a double-sliding window connected to the accumulator to detect a starting point of the symbol. A synchronization controller is connected to the accumulator to generate a synchronization signal to enable the accumulator to sample and accumulate the pulse signal. Also, a time shift calculator is connected to the accumulator to correct the starting point of the symbol determined by the double-sliding window. The time shift calculator can correct the starting point by comparing a magnitude of the accumulated pulse signal with a threshold value, and detecting a point of time when the magnitude exceeds the threshold value. The mobile communication terminal also includes a position calculator connected to the time shift calculator to calculate a position of a target based on the corrected starting point of the symbol.

Implementations can optionally include one or more of the following features. The mobile communication terminal can further include a transmitter to transmit the symbol that includes the pulse signal. The transmitter can include a pulse generator to generate the pulse signal and an OFDM symbol generator to generate an OFDM symbol. The transmitter can also include a multiplexer connected to the pulse generator and the OFDM symbol generator to output the generated pulse signal and the generated OFDM symbol in a predetermined order. The position calculator can include a distance calculator connected to the time shift calculator to calculate a distance between a target and the mobile communication terminal based on the corrected starting point of the symbol. Also, the position calculator can include a density function parameter unit connected to the accumulator to detect a density function parameter that minimizes an MSE of the accumulated pulse signal stored in the accumulator.

In yet another aspect, detecting a position using a wireless communication system includes transmitting a signal to a terminal. A symbol that includes a pulse signal transmitted from the terminal is received, and a starting point of the received symbol is detected. The pulse signal is sampled and accumulated based on synchronization information associated with the detected starting point of the received symbol. A time shift is calculated based on the accumulated pulse signal, and the starting point of the symbol is corrected based on the calculated time shift. Further, a distance between a target and a position detection device based on the corrected starting point of the symbol.

Implementations can optionally include one or more of the following features. Calculating the time shift can include comparing a magnitude of the accumulated pulse signal with a threshold value to calculate the starting point of the symbol. Calculating the time shift can also include comparing the calculated starting point of the symbol with the detected starting point of the symbol to calculate the time shift. Receiving the symbol can include receiving the symbol that includes the pulse signal and an OFDM symbol that are alternately arranged. Also, a density function parameter that minimizes an MSE of the accumulated pulse signal can be detected. The position of the target can be calculated using the pulse signal having a smallest one of at least two density function parameters obtained by repeating at least the signal transmission. Further, calculating the distance can include calculating a position radius information based on a pulse signal having a distance information corresponding to the shortest distance among the accumulated signals.

In yet another aspect, a position detection device includes an accumulator to sample and accumulate a pulse signal included in an input signal. A starting point detector is connected to the accumulator to detect a starting point of the input signal. A time shift calculator is connected to the accumulator to correct the detected starting point of the input signal based on the accumulated pulse signal. Also, a position calculator is connected to the time shift calculator to calculate a position of a target based on the corrected starting point.

Implementations can optionally include one or more of the following features. The time shift calculator can be designed to correct the starting point by comparing a magnitude of the accumulated pulse signal with a threshold value and detecting a point in time when the magnitude exceeds the threshold value.

The techniques and apparatus based on the present specification possibly can provide one or more of the following advantages. A position detection device can be implemented to detect a straight path signal in a shadowed environment having an obstacle on a straight path between a transmitter and a receiver. Also, a position detection device can be provided to detect a straight path signal in an environment having complicated multiple paths such as an indoor environment. In addition, position detection service can be provided in a confined area such as an indoor space without installing an additional base station for indoor position detection.

BRIEF DESCRIPTION OF THE DRAWINGS

FIG. 2 is a diagram showing an example synchronization signal used to accumulate a pulse signal.

FIGS. 3A and 3B show an example pulse signal generator included in a position detection device.

FIG. 6 illustrates an example pulse signal included in an orthogonal frequency division multiplexing (OFDM) symbol.

FIG. 7 is a flow chart showing an example position detection process.

Like reference symbols and designations in the various drawings indicate like elements.

DETAILED DESCRIPTION

Figure 1:
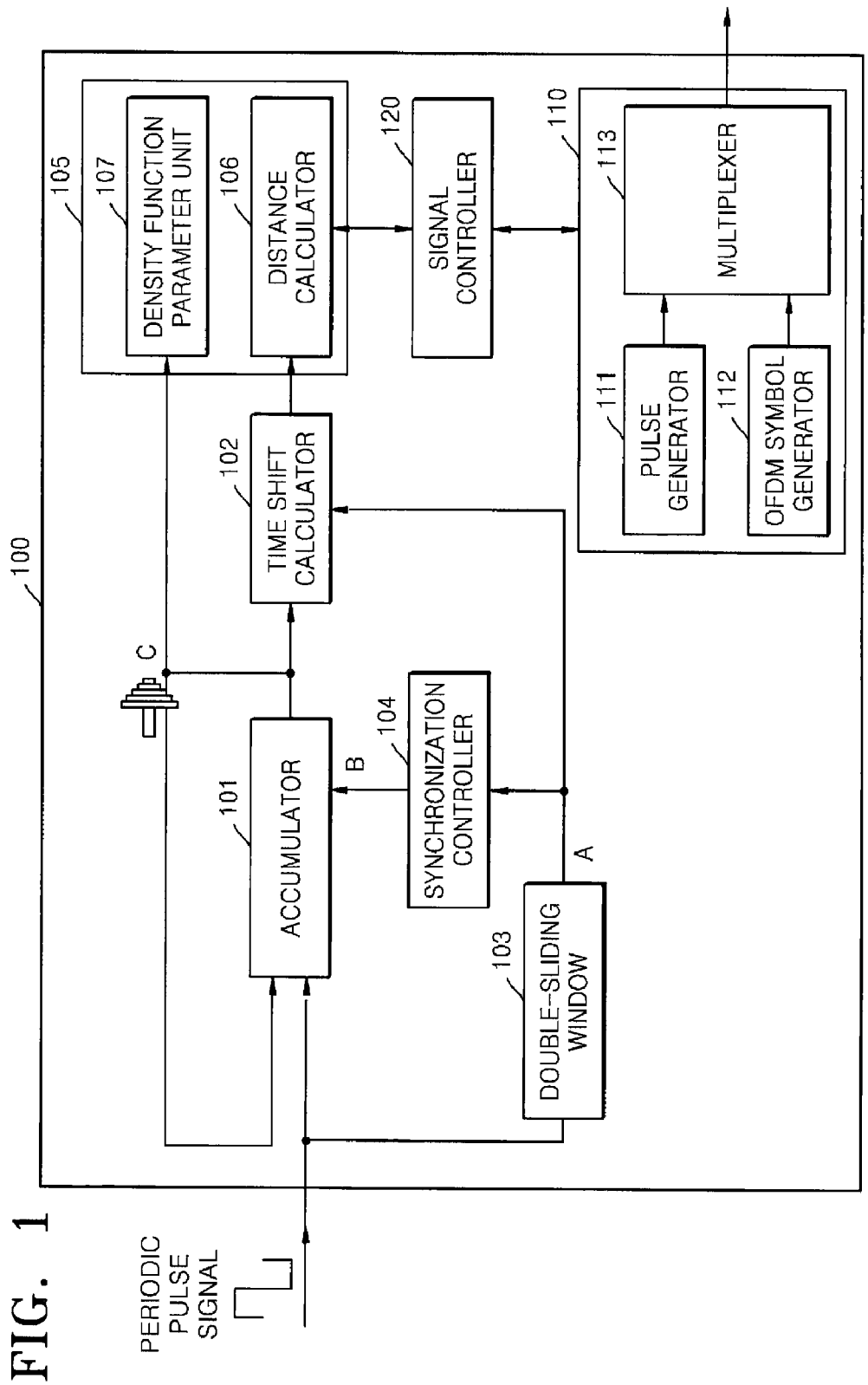
FIG. 1 is a block diagram of an example position detection or position detection device.

Various techniques and apparatus are described for improving the accuracy of position detection. For example, position detection service can be provided in a confined area such as an indoor space without installing an additional base station.

Positioning data of a target can be obtained using a global position detection system (GPS) or a narrow band channel. A system based on the narrow band channel can estimate the position of the target by using a time of arrival (ToA) of a measured position detection signal or a time difference of arrival (TDoA) of the measured position detection signal.

A position detection system using ToA can transmit a measurement signal from a target to various base stations and measure a transmission time of the measurement signal transmitted between the target and each of the various base stations to estimate a distance between the target and the position detection system. Based on values measured by each base station, circles or concentric rings can be formed with the respective base station as the center. When the target is located at an intersection of the formed circles, the position of the target can be detected.

A position detection system using TDoA can detect the position of a target based on the TDoA of measurement signals transmitted from different points. Specifically, the TDoA is measured in proportion to a difference between two distances. The first distance is measured between the target and one of two base stations, and the second distance is measured between the target and the other of the two base stations. The TDoA is measured in proportion to the difference between these two distances. The position of the target can be detected by locating the target on a hyperbola having the two base stations as focuses.

A distance between a target and a position detection system can be determined based on the timing information of the ToA of a received measurement signal. Also, the position of the target can be determined based on the timing information. A correct ToA of the measurement signal must be determined to accurately position the target. When no obstacles are present on a straight path between a transmitter transmitting the measurement signal and a receiver receiving the measurement signal, the correct timing information can be efficiently detected with respect to the ToA of the measurement signal. Thus, a narrow band signal can be used to obtain accurate position detection data in absence of obstacles on the path.

However, a narrow band frequency can reduce the accuracy of position detection data in a shadowed environment with one or more obstacles present on a straight path between the transmitter and the receiver. Also, a narrow band frequency can reduce the accuracy of position detection data in an environment with complicated multiple paths such as an indoor environment. The reduction in the accuracy of the detected position can be caused by the difficulty in detecting a straight path signal in such shadowed or complicated path environments. This may be due to a limited time resolution of a signal used for measurement. The time resolution is a standard for distinguishing multiple path signals having differential path lengths from each other in a receiver that receives a measurement signal. In addition, the time resolution is inversely proportional to the band width of a signal.

In some implementations, a wireless communication system can include a first position detection device and a second position detection device. The first position detection device and the second position detection device can be identical to each other.

The first position detection device can transmit a signal to the second position detection device and start a timer at the same time. Also, the second position detection device can transmit a signal to the first position detection device at the same time as when the signal transmitted from the first position detection device arrives at the second position detection device. The first position detection device can recognize the signal transmitted from the second position detection device and stop the timer at the same time. The time measured by the first position detection device using the timer is divided by two to obtain a time required for a signal to be transmitted between the first and second position detection devices. When the obtained time is multiplied by the velocity of light, the time can be converted into distance information.

The accuracy of the detected position can depend on a correct determination of two specific instances of time. The first instance of time identifies the point when the second position detection device receives a signal from the first position detection device and simultaneously transmits a signal to the first position detection device. The second instance of time identifies the point when the first position detection device receives the signal from the second position detection device and simultaneously stops the timer.

The techniques and systems described in this specification can use a double-sliding window to determine the existence of a signal before data is received. The double-sliding window includes two buffers having the same length and compares the energy of a previously accumulated part of a signal with the energy of a part accumulated later. Based on the comparison, the instant of time is detected at which the energies of the two parts of the signal abruptly vary as a signal starting point. A difference detected between the energies of the two parts of the signal abruptly decreases when the signal ends and the detected difference suddenly increases when the signal starts. Because the signal is delayed by the length of the buffers, the signal starting point can be obtained by subtracting the buffer length from the point at which the detected difference between the energies reaches a peak.

Also, the second position detection device can obtain the starting point of the signal transmitted from the first position detection device using a double-sliding window. Specifically, the first position detection device can obtain the starting point of the signal transmitted from the second position detection device using the double-sliding window and stop the timer when the second position detection device is detected as the source of received data.

The double-sliding window can be used to detect a signal starting point of a signal with signal intensity greater than that of noise. However, a weak or noisy signal having a signal intensity weaker than noise cannot be detected using only the double-sliding window because the signal energy difference is inversely related to the intensity of the noise. As the intensity of noise increase, the signal energy difference decreases. Techniques, apparatus, system, etc. are described in this specification to improve the accuracy of position detection for all signals including noisy signal.

FIG. 1 is a block diagram of an example position detection or a position detection device 100. The position detection device 100 is compatible with various wireless communication systems, such as GPS. The position detection device 100 includes an accumulator 101, a time shift calculator 102, a starting point detector such as a double-sliding window 103, a synchronization controller 104, and a position calculator 105.

To reduce noise, the accumulator 101 samples and accumulates a pulse signal included in an input signal, such as a symbol. In a single carrier system, information is modulated onto one carrier using frequency, phase, or amplitude adjustment of the carrier. For digital signals, the modulated information is in the form of bits, or collections of bits called symbols, that are modulated onto the carrier.

When sampled periodically and accumulated, the noise component of the pulse signal converges on "0" and thus the noise can be reduced or minimized. In particular, the accumulator 101 samples the periodic pulse signal at the period of the pulse signal. The accumulator 101 accumulates the sampled signal to obtain a signal sample with reduced noise. By reducing the noise, accurate position detection can be achieved.

The double-sliding window 103 determines the starting time or point of the symbol. The double-sliding window can include at least two buffers having the same length. Using the at least two buffers, the double-sliding window can compare the energy of a previously accumulated part of a signal with the energy of a later accumulated part of the signal. The instant of time at which the energies of the two parts of the signal abruptly vary is detected as the signal starting point.

The synchronization controller 104 provides a sampling synchronization signal to allow the accumulator 101 to sample and accumulate the pulse signal. The time shift calculator 102 corrects the symbol starting point obtained from the double-sliding window 103 based on a symbol starting time or point according to information received from the accumulator 101. A time shift corresponds to a difference between the symbol starting point detected by the double-sliding window 103 and the symbol starting point detected based on the accumulation of the pulse signal by the accumulator 101. The time shift calculator 102 compares the magnitude of the accumulated pulse signal with a predetermined threshold value and calculates a time when the magnitude of the accumulated pulse signal exceeds the threshold value. The symbol starting point detected by the double-sliding window 103 is corrected using the accumulated pulse signal having a magnitude greater than the threshold value. The resultant signal symbol has reduced noise, and the accuracy of the symbol starting point is improved over the accuracy achieved using only the double-sliding window.

The position calculator 105 calculates the position of a target from the symbol starting point corrected by the time shift calculator 102. The position calculator 105 can further include a distance calculator 106 and a density function parameter unit 107. The position calculator 105 can calculate the position of the target with a more accurate symbol starting point because a time shift is removed from the symbol starting point obtained solely from the uncorrected double-sliding window 103. As described above, the distance calculator 106 divides by two, a measured time period for a first position detection device to transmit a signal to a second position detection device and receive a signal transmitted from the second position detection device. The result of the division is multiplied by the velocity of light to calculate the distance between the position detection devices and the target. The density function parameter unit 107 uses the pulse signal stored in the accumulator 101 as a channel impulse response. The density function parameter unit 107 subtracts the pulse signal from a density function generated by increasing a parameter from 0 to obtain a mean square error (MSE). The density function parameter unit 107 generates a density function parameter that minimizes the MSE. The density function parameter relates to the parameters of probably density function for a received pulse signal. From various pulse signals, priority is given to a pulse signal having the smallest density function parameter, and the pulse signal having the smallest density function parameter is used as information for position detection. The smallest density function is detected by having the target device communication with terminals having a detection device. For example, each of at least three terminals comprising the position detection devices generates a density function parameter, and the smallest one of the at least three density function parameters is chosen. This is further described with respect to FIGS. 8A-8B below.

The position detection device 100 can operate in a wireless communication system, such as an ultra wide band (UWB) wireless local area network (LAN). A pulse signal in a UWB communication system can have a pulse-width less than 1 nanosecond (ns). Due to the wide signal bandwidth of the UWB communication system, the pulse signal can be applied in a position detection or distance measurement system operating in a multi-path environment. In addition, a position can be measured with an error of less than ten centimeters. Furthermore, the position detection device 100 can operate in the wireless communication system to perform position detection even when an additional base station is not installed in an indoor area because the wireless communication system uses a wireless LAN (WLAN).

Ultra wide bands can be set to an operating frequency in the range of 3.1 GHz through 4.8 GHz and 7.3 GHz through 10.6 GHz. Each of the ultra wide bands can be set to 528 MHz. In these ultra wide bands, signals are transmitted by alternately using multiple bands while selectively changing the frequency according to a frequency hop spread spectrum (FHSS) process. Accordingly, an unused frequency band may exist, and data communication can be performed through an unused band channel In WLAN, as the number of unused band channels increases, the number of new devices capable of participating in communication in band channels increases.

In addition, the position detection device 100 can include a transmitter 110. The transmitter 110 embeds a pulse signal in a transmission signal and transmits the transmission signal embedded with the pulse signal. The signal controller 120 can detect the received signal transmitted from another position detection device and simultaneously start a timer and transmit a signal to another position detection device. The transmitter 110 includes a pulse generator 111, an orthogonal frequency division multiplexing (OFDM) symbol generator 112 and a multiplexer 113.

The pulse generator 111 generates the pulse signal and the OFDM symbol generator 112 generates an OFDM symbol. The OFDM symbol generator 112 can include a computation block that performs forward error correction (FEC) or inverse fast Fourier transform (IFFT).

Similar to Coded OFDM (COFDM), OFDM is a digital multi-carrier modulation scheme that uses a large number of closely-spaced orthogonal sub-carriers. Each sub-carrier is modulated with a conventional modulation scheme, such as quadrature amplitude modulation at a low symbol rate, and thus maintaining data rates similar to conventional single-carrier modulation schemes in the same bandwidth. OFDM signals can be generated and detected using the Fast Fourier transform (FFT) algorithm. Also, OFDM can be implemented in a wired or wireless wideband digital communication systems.

When data corresponds to an OFDM symbol, a signal identical to an impulse signal train can be generated when a non-zero value is input to a point at which the pulse signal is desired. Unlike WLAN that transmits continuous OFDM symbols only, a pulse signal can be embedded between OFDM data symbols to improve the accuracy of position detection performed by the position detection device 100.

The multiplexer 113 multiplexes the pulse signal generated by the pulse generator 111 and the OFDM symbol generated by the OFDM generator 112. The multiplexer 113 transmits the pulse signal and the OFDM symbol according to a predetermined order. The pulse signal is periodically included in the OFDM symbol. Also, the symbol and the pulse signal can be alternately included in the transmission signal. A signal pair comprising of a symbol and a pulse signal can be transmitted one by one or two by two.

FIG. 2 shows an example operation for accumulating a pulse signal in the position detection device 100. At point A 202, the double-sliding window 103 determines a symbol starting point. The symbol starting point is approximated and then later corrected. At point B 204, the synchronization controller 104 generates a synchronization signal to enable the accumulator 101 to sample the pulse signal, store the sampled pulse signal and accumulate the stored pulse signal. At point C 206, the accumulator 101 accumulates the pulse signal according to the synchronization signal. generated by the synchronization controller 104. Accordingly, the accumulator 101 can correctly sample and accumulate the pulse signal.

FIGS. 3A and 3B show an example operation of the pulse signal generator 111. Referring to FIG. 3B, the pulse generator 111 can include a sample counter 111a and a comparator 111b. A symbol counter 301 counts symbols and a synchronization control block 302 generates a synchronization signal based on the count signal generated by the symbol counter 301. The sample counter 111a generates a sample count signal illustrated in FIG. 3A.

The comparator 111b compares the sample count signal with an index value from the synchronization control block 302 and generates a pulse signal when the index value corresponds to the sample count signal. The pulses of the pulse signal have a value "1" when the index value corresponds to the sample count signal. The pulses of the pulse signal have a value "0" when the index value does not correspond to the sample count signal. As illustrated in FIG. 3A, when the index value is M, the pulse signal is generated when the sample count signal has a value M.

Figure 4:
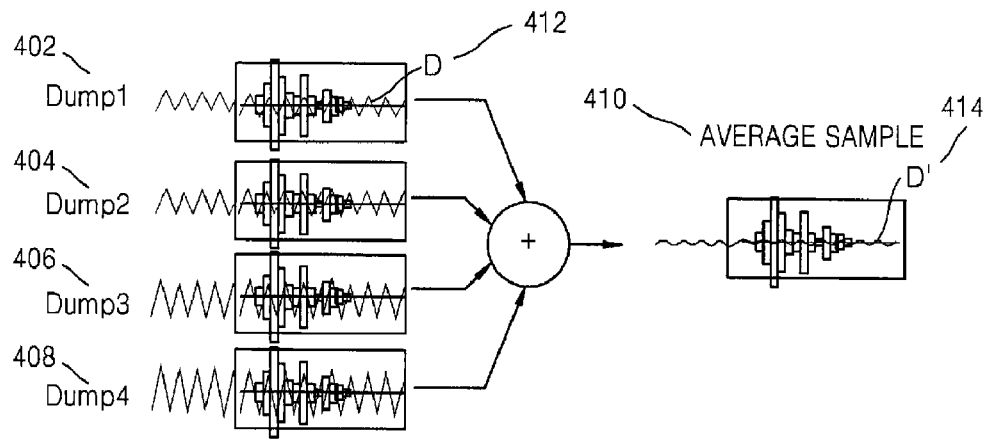
FIG. 4 is a diagram showing an example operation for accumulating a pulse signal.
Figure 5:
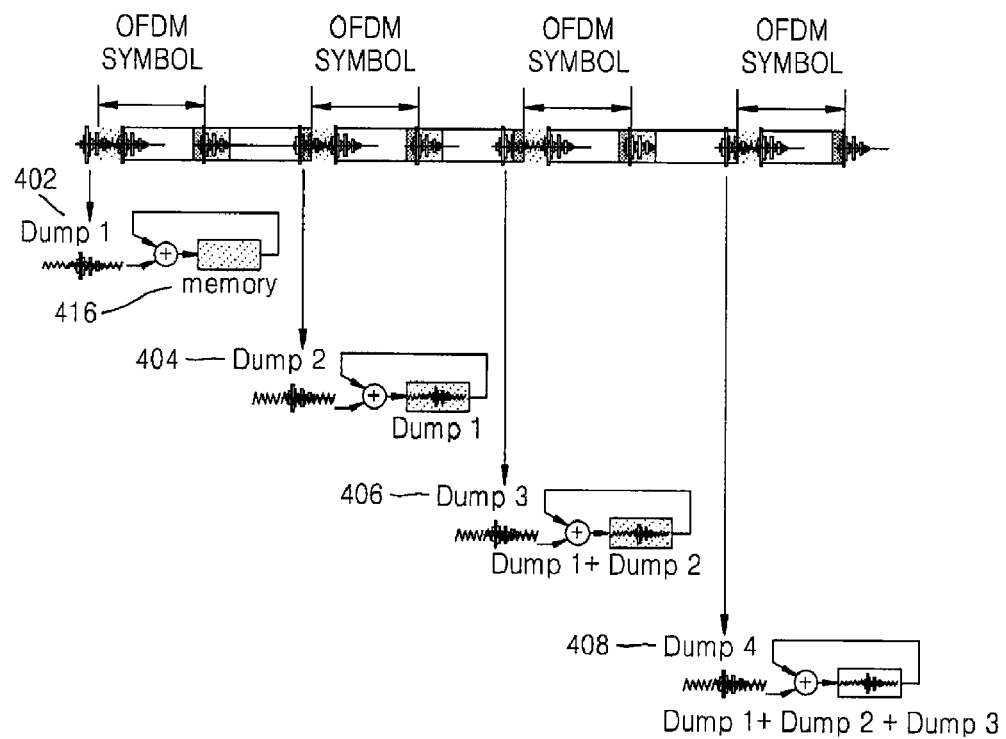
FIG. 5 illustrates an example operation for sampling and accumulating a continuous signal.

FIGS. 4 and 5 show an example operation for accumulating samples to minimize or reduce noise by converge the noise on "0". In particular, FIG. 4 shows an example operation for sampling and accumulating a pulse signal, and FIG. 5 illustrates an example operation for sampling and accumulating a continuous pulse signal.

In FIG. 4, four pulse signals Dump 1 402, Dump2 404, Dump3 406 and Dump4 408 are sampled and accumulated to obtain an sample average 410. Noises D 412 included in the sampled four pulse signals Dump 1 402, Dump2 404, Dump3 406 and Dump4 408 are accumulated and converge on "0". The accumulator 101 can sample, store and accumulate the pulse signals Dump 1 402, Dump2 404, Dump3 406 and Dump4 408. After the pulse signals Dump 1 402, Dump2 404, Dump3 406 and Dump4 408 are sampled and accumulated, the noise D' 414 in the sample average is reduced when compared to noise D 412 in the sampled pulse signals.

FIG. 5 illustrates an example operation for accumulating pulse signals when the input signal includes a signal in which an OFDM symbol and a pulse signal are periodically incorporated. First, second, third and fourth pulse signals Dump 1 402, Dump2 404, Dump3 406 and Dump4 408 are sequentially accumulated. The pulse signal and the OFDM symbol are alternately included in the input signal. The pulse signals Dump 1 402, Dump2 404, Dump3 406 and Dump4 408 are accumulated to converge the noise on "0". The pulse signals Dump 1 402, Dump 2404, Dump3 406 and Dump4 408 can be stored in a memory 416, and the sequentially input pulse signals can be stored and accumulated by summation using feedback.

FIG. 6 illustrates example pulse signals and OFDM symbols. Signal (i) 610 represents a signal in which an OFDM symbol and a pulse signal are alternately included. Signal (ii) 620 represents a signal in which two OFDM symbols and two pulse signals are alternately arranged. Signal (iii) 630 represents a signal in which two OFDM symbols, an idle period and a single pulse signal are sequentially arranged. In this manner, the pulse signals can be periodically transmitted, sampled and accumulated.

In some implementations, the position detection device 100 operating in a wireless communication system can be implemented as a mobile communication terminal. Example mobile communication terminals that operates with a wireless communication system can include a cellular phone, a personal digital assistant (PDA), etc. In such implementations, position detection can be performed using only the mobile communication terminal without any additional base stations.

FIG. 7 is a flow chart showing an example position detection process. A first mobile communication terminal that includes a position detection device 100 transmits 701 a signal to a second mobile communication terminal. Simultaneously, a timer for calculating a distance is started. The second mobile communication terminal transmits a signal including a pulse signal to the position detection device 100 of the first communication terminal as soon as the second mobile communication terminal receives the signal from the first mobile communication terminal.

The position detection device 100 receives the signal including the pulse signal from the second mobile communication terminal and detects 702 a starting point of the signal using a starting point detector, such as the double-sliding window 103. The position detection device 100 stops the timer when the first mobile communication terminal receives the signal including the pulse signal from the second terminal. Conventional position detection techniques may measure a period of time from when the timer is started to when the timer is stopped. The measured time is divided by two, and the division result is multiplied by the velocity of light to calculate a distance. However, such techniques cannot measure a correct distance because the measured time is not measured according to a correct signal starting point. The position detection process as described in this specification can correct the signal starting point detected by the double-sliding window by performing the following operations.

The position detection device 100 samples, accumulates and stores 703 the pulse signal. For example, the pulse signal is sampled according to the time synchronization information related to the symbol starting point detected by the double-sliding window 103. Accumulating the sampled pulse signal minimizes or reduces the noise by converging the noise on zero.

The accumulated pulse signal is compared to a predetermined threshold value to calculate 704 a time shift. The calculated time shift corresponds to a difference between the symbol starting point obtained by the double-sliding window 103 only and a symbol starting point obtained based on the accumulation of the pulse signal (having reduced noise).

The symbol starting point detected by the double-sliding window 103 is corrected 705 based on the calculated time shift. The time value measured using the timer includes an error because the value is obtained based on the uncorrected double-sliding window 103. Accordingly, a time shift associated with the error is calculated using the accumulated pulse signal, and the value measured by the timer is corrected using the calculated time shift. By correcting the value measured by the timer, the symbol starting point can be detected more accurately than conventional techniques based on the uncorrected double-sliding window 103.

A distance between the position detection device 100 and a target is calculated 706 based on the corrected starting point. For example, based on the corrected starting point, a period of time is measured from when the signal is transmitted to when the signal is received. The measured time based on the corrected starting point is divided by two, and the division result is multiplied by the velocity of light to calculate the distance between the position detection device 100 and the target.

A density function parameter that minimizes an MSE of the accumulated pulse signal is generated 707. A density function parameter is generated through operations 701-707 between a first mobile communication terminal and a second mobile communication terminal (the second mobile communication terminal corresponds to a target). Then, the process loops back 709 to repeat operations 701-707 to generate another density function parameter between a third mobile communication terminal and the second mobile communication terminal. If at least three density function parameters are generated, operation 708 is then performed. A pulse signal having a minimum value of the generated density function parameters is identified, and the position of the target is calculated 708 using the identified pulse signal having the minimum value of the at least three density function parameters obtained by repeating operations 701, 702, 703, 704, 705, 706 and 707. In some implementations, the position of the target can be generated based on the smallest density function of two density functions generated.

Through the pulse signal, channel information with respect to a time base can be obtained. A distance information for position detection having a small offset can be selected from the obtained channel information. A comparison can be made between the channel of a signal that has passed through an obstacle and the channel of a signal that has not passed through an obstacle. The signal that has passed through the obstacle show Rayleigh channel propensity, and the channel of that signal becomes wider as the number of obstacles through which the signal passes increases. The signal that has not passed through an obstacle has a narrow channel width. A signal having a narrow channel width can be considered as not having passed through an obstacle, and such signal has no offset. When a distance is calculated with priority given to a signal having a narrow channel width, the accuracy of position detection can be improved.

Moreover, the signal that has passed through an obstacle has a minimum MSE for a large density function parameter, and the signal that has not passed through an obstacle has a minimum MSE for a small density function parameter. Accordingly, more accurate position information can be obtained when priority is given to distance information having a small density function parameter. Also, the probability is high that a short distance among distances calculated based on multiple accumulated signals is a straight distance that does not pass through an obstacle is high. Thus, the accuracy increases for position information obtained using the short distance when compared to longer distances.

Therefore, a pulse signal can be selected to minimize the density function parameter of an accumulated signal. Alternatively, a pulse signal can be selected to provide the shortest distance from among calculated distances.

Figure 8A:
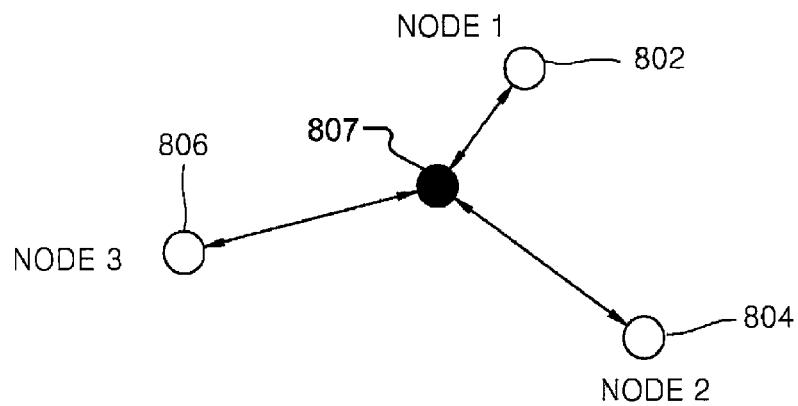
FIGS. 8A and 8B show an example standard for determining a density function parameter and distance information.
Figure 8B:
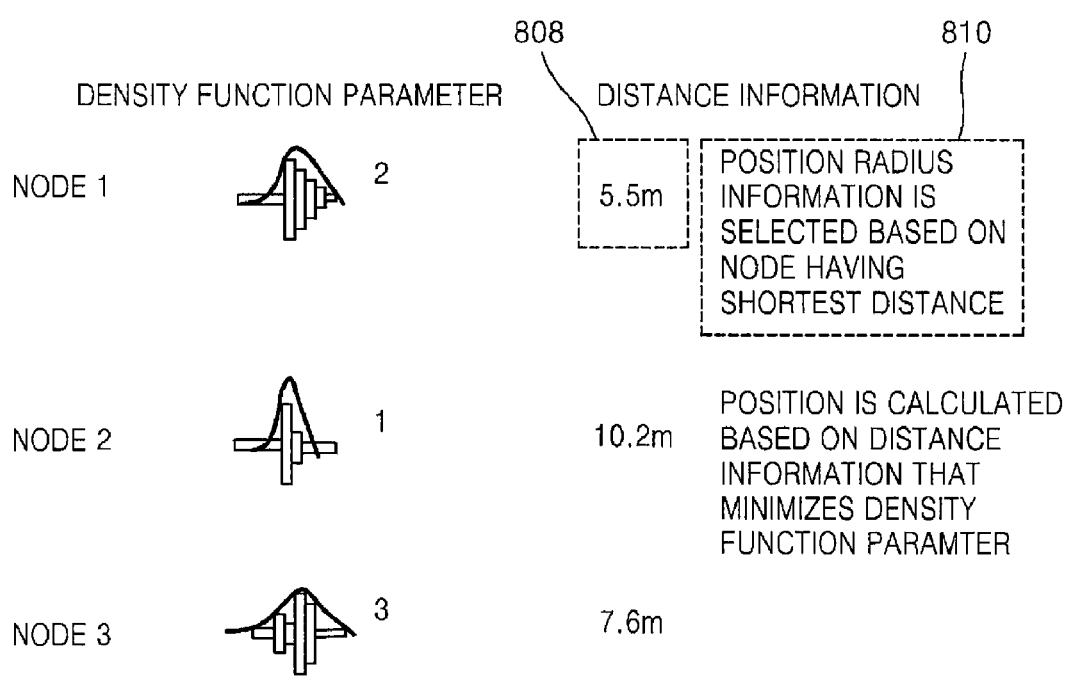

FIGS. 8A and 8B show an example density function parameter and distance information. In FIG. 8A, three nodes 802, 804 and 806 are shown with a target 807. Each of the nodes 802, 804 and 806 represent a terminal device having a detection device. Signals are transmitted/received at the target 807 from nodes 1 802, 2 804 and 3 806. FIG. 8B, shows the confirmation of the priority of selecting the most suitable density function parameter and distance information from a plurality of density function parameters and distance information at the nodes 1 802, 2 804 and 3 806.

In the example shown in FIG. 8B, the distance information 808 of node 1 802 corresponds to the shortest distance, that is, 5.5 m. Therefore, position radius information 810 is calculated based on the distance information 808 of node 1. Node 2 has a minimum density function parameter. It can be confirmed that the node 2 has the highest density. Accordingly, in this example, a position is calculated based on the signal received from the node 2.

In short, in the example shown in FIGS. 8A and 8B, the position radius information 810 is calculated based on node 1 having a minimum distance, and an accurate position is calculated based on node 2 having a smallest density parameter.

As described above, the position detection device 100 and position detection process as described in this specification can improve the accuracy of position detection. Furthermore, a straight path signal can be easily detected in a shadowed environment having an obstacle on a straight path between a transmitter and a receiver or an environment having complicated multiple paths such as an indoor environment. Moreover, a position detection service can be provided even in a confined area such as an indoor area without having to install an additional base station in the indoor area.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A position detection device associated with a wireless communication system, the position detection device comprising:
   an accumulator to sample and accumulate a pulse signal included in an input signal;
   a double-sliding window connected to the accumulator to detect a starting point of the input signal;
   a synchronization controller connected to the accumulator to generate a synchronization signal to enable the accumulator to sample and accumulate the pulse signal;
   a time shift calculator connected to the accumulator to correct the detected starting point of the input signal based on the accumulated pulse signal comprising:
   comparing a magnitude of the accumulated pulse signal with a threshold value, and
   detecting a point in time when the magnitude exceeds the threshold value; and
   a position calculator connected to the time shift calculator to calculate a position of a target based on the corrected starting point.

2. The position detection device of claim 1, wherein the wireless communication system associated with the position detection device comprising an ultra-wide band (UWB) wireless local area network.

3. The position detection device of claim 1, further comprising a transmitter to transmit the input signal that includes the pulse signal.

4. The position detection device of claim 3, wherein the transmitter comprises:
   a pulse generator to generate the pulse signal;
   an orthogonal frequency division multiplexing (OFDM) symbol generator to generate an OFDM symbol; and
   a multiplexer connected to the pulse generator and the OFDM symbol generator to output the generated pulse signal and the generated OFDM symbol in a predetermined order.

5. The position detection device of claim 4, wherein the multiplexer is configured to alternately output the generated pulse signal and the generated OFDM symbol.

6. The position detection device of claim 1, wherein the position calculator comprises:
   a distance calculator connected to the time shift calculator to calculate a distance between the target and the position detection device based on the starting point 5 corrected by the time shift calculator; and
   a density function parameter unit connected to the accumulator to detect a density function parameter that minimizes a mean square error (MSE) of the accumulated pulse signal stored in the accumulator.

7. The position detection device of claim 6, wherein the position calculator is configured to select a pulse signal having a minimum density function parameter or a pulse signal having distance information corresponding to a shortest distance to calculate the position of the target based on the selected pulse signal.

8. The position detection device of claim 6, wherein the position calculator is configured to
   obtain a position radius information based on a pulse signal having distance information corresponding to the shortest distance; and
   calculate the position of the target based on a pulse signal having a minimum density function parameter.

9. The position detection device of claim 1, wherein the time shift calculator is configured to correct the starting point comprising:
   comparing a magnitude of the accumulated pulse signal with a threshold value; and
   detecting a point in time when the magnitude exceeds the threshold value.

10. A mobile communication terminal associated with a wireless communication system, the mobile communication terminal comprising:
    an accumulator to sample and accumulate a pulse signal included in a symbol; a double-sliding window connected to the accumulator to detect a starting point of the symbol;
    a synchronization controller connected to the accumulator to generate a synchronization signal to enable the accumulator to sample and accumulate the pulse signal;

a time shift calculator connected to the accumulator to correct the starting point of the symbol determined by the double-sliding window comprising:
  comparing a magnitude of the accumulated pulse signal with a threshold value, and
  detecting a point of time when the magnitude exceeds the threshold value; and
a position calculator connected to the time shift calculator to calculate a position of a target based on the corrected starting point of the symbol.

11. The mobile communication terminal of claim 10, further comprising a transmitter to transmit the symbol that includes the pulse signal.

12. The mobile communication terminal of claim 11, wherein the transmitter comprises:
  a pulse generator to generate the pulse signal;
  an OFDM symbol generator to generate an OFDM symbol; and
  a multiplexer connected to the pulse generator and the OFDM symbol generator to output the generated pulse signal and the generated OFDM symbol in a predetermined order.

13. The mobile communication terminal of claim 10, wherein the position calculator comprises:
  a distance calculator connected to the time shift calculator to calculate a distance between a target and the mobile communication terminal based on the corrected starting point of the symbol; and
  a density function parameter unit connected to the accumulator to detect a density function parameter that minimizes an MSE of the accumulated pulse signal stored in the accumulator.

14. A method for detecting a position using a wireless communication system, the method comprising:
  transmitting a signal to a terminal;
  receiving a symbol transmitted from the terminal, wherein the symbol includes a pulse signal;
  detecting a starting point of the received symbol;
  sampling and accumulating the pulse signal based on synchronization information associated with the detected starting point of the received symbol;
  calculating a time shift based on the sampling and accumulating;
  correcting the starting point of the symbol based on the calculated time shift; and
  calculating a distance between a target and a position detection device based on the corrected starting point of the received symbol,
  wherein calculating the time shift comprises comparing a magnitude of the accumulated pulse signal with a threshold value to calculate the starting point of the symbol, and comparing the calculated starting point of the symbol with the detected starting point of the symbol to calculate the time shift.

15. The method of claim 14, wherein receiving the symbol comprises receiving the symbol that includes the pulse signal and an OFDM symbol that are alternately arranged.

16. The method of claim 14, further comprising:
  generating a density function parameter that minimizes an MSE of the accumulated pulse signal; and
  calculating the position of the target using the pulse signal having a smallest one 5 of at least two density function parameters obtained by repeating at least the transmission of the signal.

17. The method of claim 14, wherein calculating the distance comprises calculating a position radius information based on a pulse signal having a distance information corresponding to the shortest distance among the accumulated pulse signals.

18. A position detection device comprising:
  an accumulator to sample and accumulate a pulse signal included in an input signal;
  a starting point detector connected to the accumulator to detect a starting point of the input signal;
  a time shift calculator connected to the accumulator to correct the detected starting point of the input signal based on the accumulated pulse signal comprising:
    comparing a magnitude of the accumulated pulse signal with a threshold value, and
    detecting a point in time when the magnitude exceeds the threshold value; and
  a position calculator connected to the time shift calculator to calculate a position of a target based on the corrected starting point.

* * * * *